E. THOMAS.
STENCIL SHEET.
APPLICATION FILED SEPT. 19, 1917.
1,304,120.
Patented May 20, 1919.
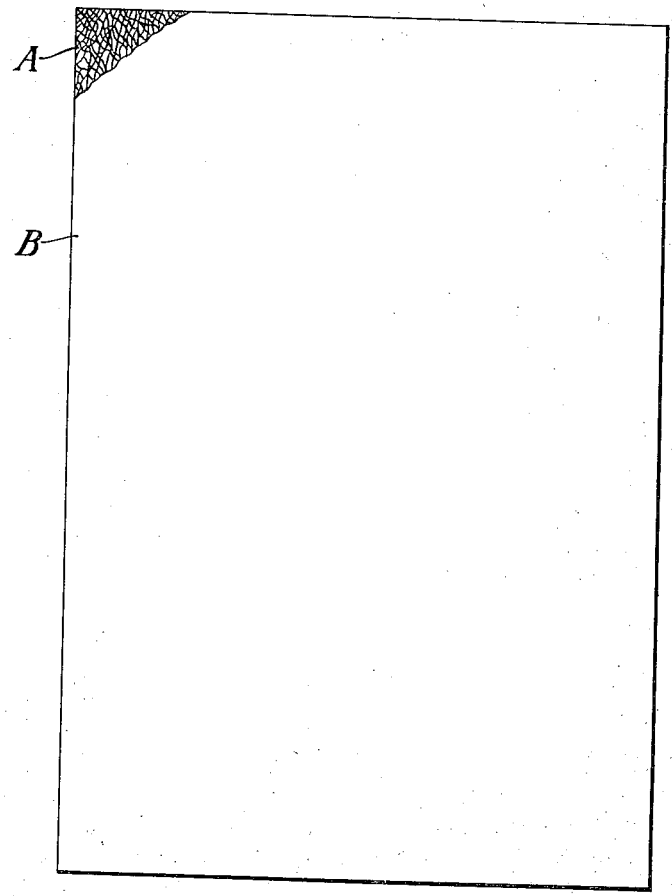
WITNESSES:
INVENTOR:
Edward Thomas,

UNITED STATES PATENT OFFICE.

EDWARD THOMAS, OF NEW YORK, N. Y., ASSIGNOR TO UNDERWOOD TYPEWRITER COMPANY, OF NEW YORK, N. Y., A CORPORATION OF DELAWARE.

STENCIL-SHEET.

1,304,120.  Specification of Letters Patent.  Patented May 20, 1919.

Original application filed December 24, 1912, Serial No. 738,412. Divided and this application filed September 19, 1917. Serial No. 192,068.

*To all whom it may concern:*

Be it known that I, EDWARD THOMAS, a citizen of the United States, residing in the city, county, and State of New York, have invented certain new and useful Improvements in Stencil-Sheets, of which the following is a specification.

My invention relates to paper compositions, and processes for coating. The object is to produce a paper of great strength which is easily rendered porous in spots, so that stencils may be prepared therefrom.

For this purpose, I take a strong porous paper and coat it by passing it through a suitable solution and drawing it over a doctor bar to remove any excess of solution. I have found it advantageous to use orange shellac varnish which has been modified by the addition of non-hygroscopic substances. I have obtained the best results by drawing Yoshino paper through an orange shellac varnish when about 30 per cent. of castor oil has been added to the shellac varnish, and then the varnish has been thickened by allowing it to stand uncovered before drawing the paper through it. The shellac varnish, which I use, is the heavy orange shellac varnish of commerce supposed to be made by cutting three and one-half pounds of gum shellac with a gallon of alcohol.

I have also made such paper by making a varnish of shellac in some solvent which also dissolves aluminum oleate and then drawing the paper through the solution. Such a solvent is amyl acetate. I have found that the solution must contain less than 10 per cent. of oleate of alumina, and, preferably, a good deal less than this, or the solution will thicken without evaporation. I believe that a good deal less than 5 per cent. of oleate of alumina and about 20 per cent. of shellac will be found best.

Paper should be coated with these varnishes by drawing it through them and then over a doctor bar. Oleate of alumina is a softener which is almost unaffected by temperature changes. Paper coated with either of these varnishes does not need to be waxed. It may be softened so as to enable types to write stencils on it, by moistening with a solution of borax in water. Said solution may be nearly concentrated and should be applied without much rubbing.

In the accompanying drawing, I show diagrammatically a sheet of one form of my stencil, wherein the grossly exaggerated Yoshino fiber is shown at A, and the coating thereon is shown at B.

This application is a division of my application, Serial No. 738,412, filed December 24, 1912 (now Patent No. 1,243,780, dated October 23, 1917).

While I have described in detail certain embodiments of my invention, it will be obvious to those skilled in the art that many improvements and modifications may be made therein; and I have set forth details only to enable those skilled in the art to understand how my invention may be used in certain of its preferred forms.

What, therefore, I claim as my invention is:

1. Porous paper and a varnish thereon including castor oil and adapted to be easily displaced by types to form a stencil.

2. The combination with a Yoshino base, of a continuous coating of shellac on said base, and castor oil incorporated with said shellac adapted to enable the shellac to be displaced by types to form stencil characters.

3. The combination with Yoshino paper, of a coating thereon including gum shellac, and a non-hygroscopic substance adapted to render the shellac permanently soft and pliable, and adapted to enable the shellac to be further softened by a suitable moistening material.

4. The combination with Yoshino paper, of a continuous coating thereon including shellac, and a non-hygroscopic substance lacking the firmness of shellac and incorporated therewith as a softener to enable the coating to be pushed aside to form a stencil.

5. The combination with Yoshino paper, of a continuous coating thereon which is adapted to be pushed aside to form a stencil, said coating comprising shellac and a non-hygroscopic substance.

6. The process of making a stencil sheet which comprises preparing a solution comprising gum shellac and a non-hygroscopic substance and coating an open meshed material therewith.

7. The process of making a stencil sheet which comprises preparing a solution comprising gum shellac and castor oil and alcohol and coating a sheet of Yoshino paper therewith.

EDWARD THOMAS.

Witnesses:
EDITH B. LIBBEY,
JENNIE P. THORNE.